US012058213B2

(12) United States Patent
Zou et al.

(10) Patent No.: US 12,058,213 B2
(45) Date of Patent: Aug. 6, 2024

(54) DEVICE-FREE HUMAN IDENTIFICATION AND DEVICE-FREE GESTURE RECOGNITION

(71) Applicants: THE REGENTS OF THE UNIVERSITY OF CALIFORNIA, Oakland, CA (US); Nanyang Technological University, Singapore (SG)

(72) Inventors: Han Zou, Berkeley, CA (US); Costas Spanos, Layfayette, CA (US); Yuxun Zhou, Chicago, IL (US); Jianfei Yang, Singpore (SG); Lihua Xie, Singapore (SG)

(73) Assignees: THE REGENTS OF THE UNIVERSITY OF CALIFORNIA, Oakland, CA (US); NANYANG TECHNOLOGICAL UNIVERSITY, Singapore (SG)

( * ) Notice: Subject to any disclaimer, the term of this patent is extended or adjusted under 35 U.S.C. 154(b) by 707 days.

(21) Appl. No.: 17/269,064

(22) PCT Filed: Aug. 19, 2019

(86) PCT No.: PCT/US2019/047049
§ 371 (c)(1),
(2) Date: Feb. 17, 2021

(87) PCT Pub. No.: WO2020/037313
PCT Pub. Date: Feb. 20, 2020

(65) Prior Publication Data
US 2022/0124154 A1    Apr. 21, 2022

Related U.S. Application Data

(60) Provisional application No. 62/719,901, filed on Aug. 20, 2018, provisional application No. 62/719,224, filed on Aug. 17, 2018.

(51) Int. Cl.
H04L 29/08 (2006.01)
H04L 67/12 (2022.01)
H04W 84/18 (2009.01)

(52) U.S. Cl.
CPC ............. *H04L 67/12* (2013.01); *H04W 84/18* (2013.01)

(58) Field of Classification Search
CPC ..... H04W 84/18; H04W 80/00; H04W 80/02; H04W 80/04; H04L 67/12; H04L 67/125; H04L 67/01; H04L 67/1396
See application file for complete search history.

(56) References Cited

U.S. PATENT DOCUMENTS

2016/0006723 A1   1/2016  Wilson
2018/0131554 A1*  5/2018  Liu ...................... H04L 27/362
2020/0064444 A1*  2/2020  Regani .................... G01S 7/417

FOREIGN PATENT DOCUMENTS

CN      108901021     *  6/2018
WO      2017155634       9/2017

OTHER PUBLICATIONS

Zou et al. "WiFi-Based Human Identification via Convex Tensor Shapelet Learning," AMI Publications, Thirty-Second AMI Conference on Artificial Intelligence, Apr. 25, 2018, [retrieved on Oct. 4, 2019]. Retrieved from the Internet: <URL: https://aaai.org/ocs/index.php/AMIIAAAI18/paper/view/16150> pp. 1711-1718.

(Continued)

Primary Examiner — Phong La
(74) Attorney, Agent, or Firm — McCoy Russell LLP

(57) ABSTRACT

A system can include multiple WiFi-enabled commercial off the shelf (COTS) Internet of Things (IoT) devices disposed within an environment and configured to be a transmitter (TX) or a received (RX) to send or receive data over a WiFi radio frequency communication link. A server can be configured to receive and parse the CSI data transmitted from the RX, store the CSI data with a corresponding human identity label collected for training, train a human identification classifier using a Convex Clustered Concurrent (Continued)

Shapelet Learning ($C^3SL$) method, and estimate an identification of a user based on the CSI data and the $C^3SL$ method. The server can be configured to receive and parse the CSI data transmitted from the RX, transfer the CSI data into real-time CSI frames, store the real-time CSI frames in a database, store the real-time CSI frames with a corresponding gesture label collected in an original environment, and estimate and identify the gesture performed by user using a trained target encoder and source classifier.

19 Claims, 14 Drawing Sheets

(56) References Cited

OTHER PUBLICATIONS

Kianoush et al. "A Cloud-IoT Platform for Passive Radio Sensing," IEEE Internet of Things Journal, 5(5), 3624-3636. [retrieved on Oct. 5, 2019]. Retrieved from the Internet: <URL: https://ieeexplore.ieee.orgldocument/8356744f> entire document.

Mohammadi et a\. "Deep Learning for IoT Big Data and Streaming Analytics: A Survey," IEEE Communications Surveys & Tutorials arXiv: 1712.04301v2 [es.NI] Jun. 5, 2018 [retrieved on Oct. 4, 2019]. Retrieved from the Internet: <URL:https:llarxiv.org/pdf/1712.04301.pdf> pp. 1-40.

Motiian et a\. "Few-Shot Adversarial Domain Adaptation," 31st Conference on Neural Information Processing Systems (NIPS 2017), Long Beach, CA, [retrieved on Oct. 6, 2019]. Retrieved from the Internet: <URL: https://papers.nips.cc/paper/7244-few-shot-adversa rial-domain-adaptation.pdf> pp. 1-11.

International Search Report and Written Opinion, PCT/US2019/047049, Nov. 5, 2019, 11 pages.

* cited by examiner

DEVICE-FREE HUMAN IDENTIFICATION AND DEVICE-FREE GESTURE RECOGNITION

CROSS-REFERENCE TO RELATED APPLICATIONS

This application is a 371 of International Application No. PCT/US2019/047049, filed Aug. 19, 2019, which claims priority to and the benefit of U.S. Provisional Patent Application No. 62/719,224 filed Aug. 17, 2018, the content of which is incorporated herein by reference in its entirety. This application also claims priority to and the benefit of U.S. Provisional Patent Application No. 62/719,901 filed Aug. 20, 2018, the content of which is incorporated herein by reference in its entirety.

BACKGROUND

Human identification, which aims to automatically associate a person with his or her identity, is a critical underpinning not only for secure authentication but also for tailoring services to each individual. In particular, it has become an important, if not indispensable, tool for many emerging applications in human-in-the-loop cyber-physical systems. In addition to automatic access authorization that vastly improves user experience, an integrated human identification system can also help achieving preventive actions to protect children and elderly people, and realizing tailor-made services in a smart home, such as playing customized music, sports or TV shows, based on the identity information made available by the system.

Conventional human identification systems (e.g., biometric-based and vision-based approaches) either require the deployment of dedicated infrastructure or the active cooperation of users to carry additional devices, which are expensive, inconvenient, and privacy intrusive for pervasive implementation. For example, the use of biometric signatures (e.g., fingerprint, face recognition, and iris) is able to provide high identification accuracy. However, a specific and expensive hardware must be deployed and users' physical interaction with the equipment is required.

To alleviate the issues of high cost and user involvement, researchers propose using accelerometers embedded in wearable devices to collect gait information for identification purposes. But, requiring users to carry these devices may disadvantageously introduce considerable inconvenience for the person.

Conventional device-free human identification systems are based on video monitoring from cameras, but the performance of these vision-based approaches relies on appropriate lighting conditions and, more critically, they raise significant privacy concerns. Thus, a non-intrusive, privacy-preserving, cost-effective, and accurate human identification scheme is desired urgently.

Recently, the ubiquity of WiFi infrastructure and WiFi-enabled mobile devices (MDs) have enabled a myriad of applications in context-aware services and location-based services. Furthermore, with the booming development of the Internet of Things (IoT), billions of WiFi-enabled IoT devices, such as thermostats, sound bar, and smart TVs, are en route to being widely deployed in indoor environments. Because the body movements of a human introduce variations in WiFi Received Signal Strength (RSS) measurements, device-free occupancy sensing becomes feasible by way of analyzing the signals.

Being a coarse measurement, nevertheless, RSS usually fails to capture the multipath effects caused by complicated human motions. Alternatively, at the physical layer, Channel State Information (CSI) describes how a WiFi signal propagates from a transmitter (TX) to a receiver (RX) through multiple paths at the granularity of Frequency Division Multiplexing (FDM) subcarriers, which is more sensitive to the presence and movements of an object and is more robust to background noise. Being an off-the-shelf and fine-grained sensing measurement without the introduction of any extra infrastructure or user involvement, CSI data is the ideal sensing recourse for device-free and low-cost human identification.

In the era of Internet of Things (IoT), gesture recognition is a critical underpinning to facilitate pervasive human-computer interaction in numerous smart home applications. For instance, home automation tasks, e.g., remote control of the household device and adjust the temperature and brightness level for personalized thermal comfort, can be achieved by gesture recognition. Furthermore, it can be implemented in entertainment and gaming without requiring the user to carry dedicated controllers.

Although several sensing techniques have been proposed for gesture recognition, myriad issues limit them from ubiquitous implementation. Wearable devices (e.g., watches and wristbands) with inertial measurement units (IMUs) have been proposed to identify gestures but carrying the device all the time is inconvenient for the user.

Vision-based systems use RGB cameras and IR depth-finding cameras to realize gesture identification in a device-free manner. However, such systems need favorable lighting conditions to guarantee their performance, and continuous video monitoring raises privacy concerns. Radio frequency (RF) signals from software defined radio (SDR) platforms have been utilized for gesture recognition but the high cost of the SDR platform is impractical for large-scale employment.

In indoor environments, the most pervasive RF signal is WiFi. Its infrastructure is widely available in buildings and nearly every IoT device is WiFi enabled. These merits made WiFi the primary RF sensing technique for indoor context-aware and location-based services, and several attempts of using WiFi measurements, e.g., Received Signal Strength (RSS) and Channel State Information (CSI), to distinguish gestures have been proposed.

Since CSI readings are reported from the physical layer, which describes the propagation paths of WiFi signals at the granularity of Frequency Division Multiplexing (FDM) subcarriers, it is more robust to background noise and sensitive to micro human movements than RSS. Although CSI-based gesture recognition systems have been proposed recently, they require laptops with external WiFi adapters as receivers (RX) for data collection and only CSI amplitude measurements are exploited to identify gestures. Furthermore, sophisticated de-noising and feature selection schemes need to be designed, which requires expert knowledge.

Another key challenge of existing CSI-based gesture recognition systems is how to improve the system portability and robustness over spatial and temporal dynamics. Since CSI describes how WiFi signal propagates from a transmitter (TX) to an RX through multiple paths, environment setup changing or operating in a new environment will modify the length of existing multi-paths or introduce new multi-paths. It will lead to drastic deviation of the real-time CSI readings from those data collected during offline training.

Thus, the trained-once gesture classifier generated at a particular time or location in one environment may not be able to serve as the reference for consistent gesture recognition in long-term deployments in itself or other environments. Existing CSI-based gesture recognition systems perform the entire training process (e.g., including training data collection labeling, and brand-new classifier generation) when the environmental scenario is altered. It is impractical because the process is time-consuming and labor-intensive to obtain enough label data to fine-tune a new classifier. Thus, an automatic and effective scheme that is able to neutralize the impact of environmental dynamics on gesture recognition performance is urgently desired.

SUMMARY

Certain implementations of the disclosed technology are generally directed to a human identification system. Conventional human identification systems (e.g., biometric-based and vision-based approaches) either require the deployment of dedicated infrastructure or the active cooperation of users to carry additional devices, which are expensive, inconvenient, and privacy-intrusive for pervasive implementation.

Embodiments may include a human identification system that leverages the measurements from existing WiFi-enabled Internet of Things (IoT) devices and produces the identity estimation via a novel sparse representation learning technique. The key idea is to use the unique fine-grained gait patterns of each person revealed from the WiFi Channel State Information (CSI) measurements, technically referred to as shapelet signatures, as the "fingerprint" for human identification. For this purpose, a novel OpenWrt-based IoT platform may be designed to collect CSI data from commercial IoT devices.

In certain embodiments, a new optimization-based shapelet learning framework may be implemented for tensors, namely Convex Clustered Concurrent Shapelet Learning ($C^3SL$), which formulates the learning problem as a convex optimization. The global solution of $C^3$ SL can be obtained efficiently with a generalized gradient-based algorithm, and the three concurrent regularization terms may reveal the inter-dependence and the clustering effect of the CSI tensor data.

Certain implementations of the disclosed technology are generally directed to a gesture recognition system. Existing gesture recognition systems either require dedicated extra infrastructure or user's active cooperation, which are expensive, inconvenient, and privacy-intrusive. Although some WiFi-based gesture recognition systems have been proposed, they are venerable to environmental dynamics and rely on the tedious data re-labeling and expert knowledge each time being implemented in a new environment.

Certain embodiments may include a WiFi-based device-free adaptive gesture recognition scheme, WiADG, that is able to identify human gestures accurately and consistently under environmental dynamics via adversarial domain adaptation. Firstly, a novel Internet of Things (IoT) platform may be used to enable the direct collection of Channel State Information (CSI) measurements from WiFi-enabled commercial IoT devices.

After constructing an accurate source classifier with labeled source CSI data via the proposed convolutional neural network in the source domain (e.g., original environment), an unsupervised domain adaptation scheme may be used to reduce the domain discrepancy between the source and the target domain (e.g., new environment) and thus improve the generalization performance of the source classifier. The domain-adversarial objective may be to train a generator (e.g., a target encoder) to map the unlabeled target data to a domain invariant latent feature space so that a domain discriminator cannot distinguish the domain labels of the data. In the phase of implementation, the trained target encoder may be used to map the target CSI frame to the latent feature space and use the source classifier to identify various gestures performed by the user.

DETAILED DESCRIPTION

Figure 1:
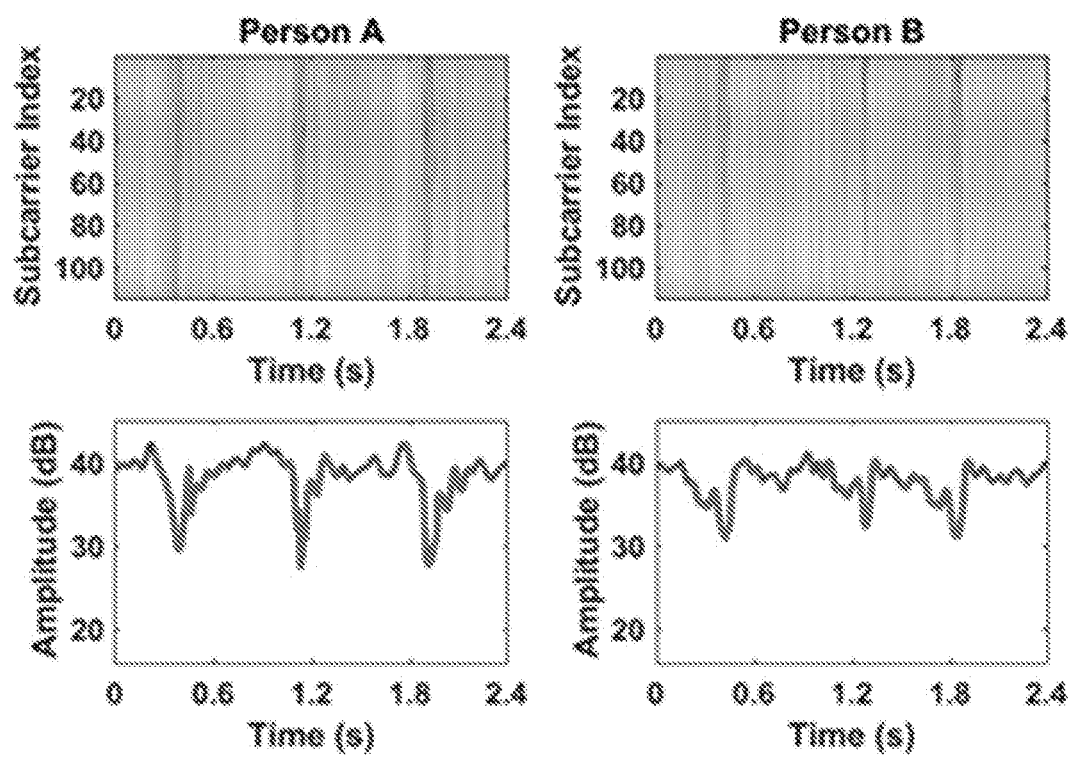
FIG. 1 illustrates an example of Channel State Information (CSI) amplitude readings of two human subjects.

Certain implementations of the disclosed technology may include AutoID, a WiFi-based device-free gesture recognition system that is able to produce an identity estimation by way of convex tensor shapelet learning using Channel State Information (CSI) measurements from commercial off-the-shelf (COTS) WiFi-enabled IoT devices. A key observation is that a person's unique gait and body movement can be characterized by a small continuous fraction, technically known as shapelets, of the CSI measurement. Hence, human identification can be readily achieved by learning the shapelets from the multi-stream, time-dependent data and then using them as the signature or "fingerprint" of a person.

Certain implementations of the disclosed technology may include an innovative CSI enabled IoT platform such that CSI readings can be obtained directly from COTS IoT devices instead of deploying laptops as RXs for CSI data acquisition. Moreover, such implementations may leverage both CSI amplitudes and CSI phase differences across pairs of RX antennas to construct CSI frames as the input dataset for classifier generation.

An optimization-based shapelet mining method, referred to herein as Convex Clustered Concurrent Shapelet Learning ($C^3SL$), can be used to formulate shapelet learning from tensors as a convex optimization problem and establish an efficient generalized gradient-based algorithm. Moreover, the incorporation of three concurrent regularization terms can enable the automatic learning of the inter-dependence and the clustering effect of time series CSI tensor data.

The disclosed $C^3SL$ is the first convex shapelet learning framework that avoids the costly combinatorial search over subsequences, making the shapelet technique scalable to real-world big-data scenarios. It also extends shapelet learning to data sets in the form of 3-way tensors (multiple time series). Experiments may be conducted in multiple real-world environments and the results generally justify the idea of using CSI shapelet as the fingerprint, as well as the effectiveness of the $C^3SL$ framework.

Implementations of the disclosed technology may include a WiFi-enabled device-free gesture recognition system that may be able to identify common human gestures with consistent high accuracy and robust to environmental dynamics via unsupervised adversarial domain adaptation.

An innovative CSI enabled IoT platform may be implemented such that CSI readings can be obtained directly from commercial off-the-shelf (COTS) IoT devices instead of deploying laptops as RXs for CSI data acquisition. Moreover, instead of using CSI amplitudes, CSI phase differences may be leveraged across pairs of RX antennas to construct CSI frames as the input dataset for classifier generation.

In the original environment (e.g., source domain), a convolutional neural network (CNN) may be designed to extract the most discriminative local features from the CSI frames, to construct a source encoder (e.g., map CSI frames to a domain invariant latent feature space) and an accurate source gesture classifier. The training process generally does not require intensive human intervention because all the parameters in CNN are fine-tuned from end to end automatically.

An unsupervised domain adaptation scheme may be implemented to tackle the environmental dynamics issue when the system operates in an untrained environment (e.g., target domain). Since the disclosed CSI enabled IoT platform is generally able to capture CSI frames in a non-intrusive manner with high sampling rate, unlabeled data may be easily obtained in the target domain.

To minimize the domain discrepancy distance between source and target domains, a domain-adversarial objective function may be implemented to train a generator (e.g., target encoder) to map the target data to the domain invariant latent feature space so that a domain discriminator cannot distinguish the domain labels of the data. After that, the trained target encoder may be used to map the real-time target CSI frame to latent space and use source classifier to identify various gestures.

Experiments may be conducted in multiple real-world environments and validate that the system can provide accurate gesture identification consistently against environmental dynamics without the tedious training process of data collection and labeling for new classifier generation in the target domain.

Implementations of the disclosed system may significantly improve the portability of WiFi-based device-free gesture recognition system. A user can easily set up and operate it reliably with high recognition accuracy for a long time across a wide range of indoor environments.

Examples of Device-Free Human Identification

WiFi signals propagate through multiple paths from a transmitter (TX) to a receiver (RX) in indoor environments due to reflection, scattering, and diffraction introduced by walls, doors, and furniture, as well as the movements of occupants. Different from RSS, which only captures the superimposition of multipath signals, CSI reveals fine-grained information about how the signal is propagated and interfered, including different time delays, amplitude attenuation, and phase shift of multiple paths on each subcarrier.

Analyzing these signal propagation variations caused by human motions makes device-free gesture recognition feasible. In short, the signal can be modeled as a channel impulse response $h(\tau)$ and the OFDM receiver is able to provide a sampled version of the signal spectrum of each subcarrier in the frequency domain, which contains both amplitude attenuation and phase shift as complex numbers. These measurements can be summarized as CSI: $H_i=\|H_i\|e^{j\angle H_i}$ where $\|H_i\|$ and $\angle H_i$ denote the amplitude and the phase of the CSI at the $i^{th}$ subcarrier, respectively.

Most existing CSI-based sensing systems adopt the Intel 5300 NIC tool to extract the CSI data from laptops with external WiFi NIC cards. Requiring laptops as receivers severely limit them from large-scale implementation. To overcome this bottleneck, implementations of the disclosed technology may include a CSI enabled IoT platform so that the CSI measurements from regular data frames transmitted in the existing traffic can be obtained directly from the COTS IoT devices, such as commodity WiFi routers.

OpenWrt may be used as the OS for the platform since it is a lightweight and widely used Linux OS for embedded devices. Embodiments may include upgrading the Atheros CSI Tool and developing a new OpenWrt firmware for IoT device for CSI acquisition. In addition, the disclosed platform may report CSI data on all the 114 subcarriers for 40 MHz bandwidth on 5 GHz central frequency, which provides much more information than conventional CSI tools. At each time instance, each TX-RX pair may be able to provide $N_{TX} \times N_{RX} \times 114$ CSI amplitude and phase measurements, where $N_{TX}$ and $N_{RX}$ represent the number of TX and RX antennas, respectively.

By leveraging the designed CSI enabled IoT platform, a preliminary experiment may be conducted by using two TP-LINK N750 wireless routers (e.g., one as TX and another one as RX) to evaluate whether distinct CSI measurements can be revealed for human identification. In the experiment, the two routers were put 1 m away on a table in a conference room.

FIG. 1 depicts the CSI amplitude readings (e.g., after Discrete Wavelet Transform (DWT) based de-noising) when Person A and Person B were walking three steps along the same path. As shown in FIG. 1, the periodical patterns of peak and valley, which indicate the gait cycles, can be easily observed from the CSI readings for both human subjects. Moreover, the shape of each step for the same person displays evident similarity, while the shapes of the gait cycle and step lengths for disparate individuals exhibit noticeable distinction.

The above observation implies that the unique gait information of each individual can be extracted from the CSI time series data and characterized by sub-sequences at critical times, known as shapelets. CSI shapelet analysis provides a sparse and unique representation of the high-resolution CSI data obtained from a person, like a fingerprint. Also, according to the biometric research, the gait cycle contains unique information that can be used as a biometric signature to identify the person. The above suggests mining CSI shapelets and storing them in a database to build classifiers for human identification.

Implementations of the disclosed technology generally include a novel optimization-based shapelet learning framework, namely Clustered Concurrent Shapelet Learning ($C^3SL$) Algorithm. Compared to existing shapelet learning methods, $C^3SL$ is advantageous in that (1) the formulation is convex and can be solved globally and efficiently with a generalized gradient-based algorithm, and (2) the incorporation of three concurrent regularization terms enables the automatically learning of the inter-dependence and the clustering effect of multiple time series.

The CSI data, or more generally a three-way tensor, may be denoted as follows:

$$X \in R^{M \times N \times T} \quad (1)$$

where M is the number of subcarriers, N is the number of samples obtained and T is the length of the measurement in each experiment. Notation-wise, $X_{(m)}$ is used to denote the N×T matrix containing all measurements from the subcarrier m. Its ($i^{th}$) row is denoted by $X_{(m),i}$ and its ($i,j^{th}$) element by $X_{(m),ij}$.

One goal may be to learn a "Shapelet Coefficient" matrix $W \in R^{T \times M}$, which indicates the location and strength of all shapelets in X. For clarity, $W=[w_{(1)}, w_{(2)}, \ldots, w_{(m)}]$ may be denoted, e.g., each $w_{(m)}$ is a T×1 vector containing the shapelet coefficient for subcarrier m (or task m). Now consider the following learning problem:

$$\min_{\substack{W \in R^{T \times M} \\ \Sigma \in S^M}} \sum_{m=1}^{M} \|1 - y \circ X_{(m)} W_{(m)}\|_H +$$

$$\lambda \text{trace}\left\{W\Pi \sum\nolimits^{-1} (\Pi W)^T\right\} + \rho_1 \|W\|_1 + \rho_2 \|RW\|_1 + \rho_3 \|W\|_{2,1}$$

where y is the label of the human subject, which is a binary class indicator variable $y \in \{-1,1\}$, the $\circ$ operator indicates the element-wise product, $\|\cdot\|_H$ is the "Hinge Norm" for a vector of dimension N, i.e., $$\|v\|_H = \sum_{i=1}^{N} \max\{0, v_i\}.$$

The centering projection matrix $\Pi \square I - U$, where $$U = \frac{II^T}{M}$$

and I is a vector of all ones with dimension N.

$$\|W\|_1 \square \sum_{m=1}^{M} \sum_{t=1}^{T} \|W_{tm}\|$$

is the Lasso Regularization for a matrix, and $$\|W\|_{2,1} \square \sum_{t=1}^{T} \sqrt{\sum_{m=1}^{M} W_{tm}^2}$$

is the Grouped Lasso Regularization. R is a (T−1)×T matrix in which $R_{i,i}=1$, $R_{i,i+1}=-1$, and all the other elements are zeros. Hence:

$$\|RW\|_1 = \sum_{m=1}^{M} \sum_{t=1}^{T-1} \|W_{m,i+1} - W_{m,i}\|$$

The intuition for the above formulation is the following. The first term may be regarded as the "classification loss" for the tensor data. Because a hinge loss is used for each sample, this loss term is similar to that of SVM classification and is convex. The second term induces "clustering" among learning tasks since it can be considered as an approximation of the "minimal within-cluster maximal between-cluster" criterion. The matrix $\Sigma \in S^M$ is a M×M symmetric positive definite matrix. This penalty can automatically capture the grouping of tasks and ensure that only related tasks (e.g., subcarriers) are used to improve the shapelet learning. Moreover, it is known that the problem $$\min_{\substack{W \in R^{T \times M} \\ \Sigma \in S^M}} \text{trace}\left\{W\Pi \sum\nolimits^{-1} (\Pi W)^T\right\}$$

is convex. The combined usage of the Lasso and Grouped Lasso Regularization allows the learning of "sparse grouped" features and is widely used in Multi-task Learning literature for sparse feature selection. Finally, the term $\|RW\|_1$, sometimes called fused Lasso Regularization, imposes the continuity of the learned patterns. This is important as a shapelet by definition should be a subsequence instead of a set of disjoint features.

In sum, the proposed learning objective minimizes the regularized classification loss, with regularization terms including (1) the grouping of tasks, (2) the sparsity of learned shapelets, and (3) the continuity imposed by the definition of shapelet. In addition, the above learning problem is convex.

$$\min_{W \in R^{T \times M}} \underbrace{\sum_{m=1}^{M} \|1 - y \circ X_{(m)} W_{(m)}\|_H^2 + \min_{\Sigma \in S^M} \lambda \text{trace}\left\{W\Pi \sum\nolimits^{-1} (\Pi W)^T\right\}}_{g(W)} + \underbrace{\rho_1 \|W\|_1 + \rho_2 \|RW\|_1 + \rho_3 \|W\|_{2,1}}_{h(W)} \quad (2)$$

To solve the above learning problem, the Accelerated Generalized Gradient Method (AGGM) may be adopted to achieve fast learning for large scale problems. The AGGM is one of the best first-order methods that solves optimization of the form $$\min_{x \in \square^N} g(x) + h(x)$$

for g(x) convex differentiable and h(x) convex. With some initial $x^0$, $x^{-1}$, the AGGM repeats for k=1, 2, 3, . . . that $$y = x^{(k-1)} + \frac{k-2}{k-1}(x^{(k-1)} - x^{(k-2)}) \quad (3)$$
$$x^{(k)} = prox_{\tau_k}(y - \tau_k \nabla g(y))$$

where $$prox_t(x) = \arg\min_z \frac{1}{2t}\|x - z\|^2 + h(z)$$

and $\nabla$ is the gradient operator. This algorithm achieves a $$O\left(\frac{1}{k^2}\right)$$

convergence rate.

In order to apply AGGM, the hinge loss may be modified into a squared hinge loss that ensures the differentiability, and the problem may be rewritten into Equation (2). The gradient of the first term in g(W) is straightforward and can be obtained in an explicit form. The gradient of the second term fits in the "Parametric Dual Maximization" framework, where the gradient can be obtained by regarding W as the parameter of the dual problem of the term. More specifically, with singular value decomposition:

$$min_{\sum \in S^M} \text{trace}\left\{WII\sum^{-1}(IIW)^T\right\} =, \min_{\substack{\lambda \in R^M \\ \alpha \leq \lambda_m \leq \beta \\ I^T\lambda = \gamma}} \sum_{m=1}^M \frac{\sigma_m^2}{\lambda_m} \quad (4)$$

and the dual problem reads:

$$\max_{v \geq 0} \sum_i 2\sigma_i v I(\alpha\sqrt{v} \leq \sigma_i \leq \beta\sqrt{v}) + \quad (5)$$
$$\sum_i \left(\frac{\sigma_i^2}{\alpha} + v\alpha\right) I(\sigma_i \leq \alpha\sqrt{v}) \sum_i \left(\frac{\sigma_i^2}{\beta} + v\beta\right) I(\beta\sqrt{v} \leq \sigma_i) - v\gamma$$

In addition, one can show that the gradient of this term can be obtained by using the solution of the dual problem through:

$$\frac{\delta \text{trace}\left\{WII\sum^{-1}(IIW)^T\right\}}{\delta \sigma_i} = \frac{2\sigma_i}{\lambda_i}$$

Concerning the computation of the proximal operation associated with the non-smooth regularizations, one can observe that the problem $$prox(V) = \arg\min_W \frac{1}{2}\|W - V\|_F + \rho_1\|W\|_1 + \rho_2\|RW\|_1 + \rho_3\|W\|_{2,1} \quad (6)$$

decouples in rows of W. Hence to get the ith row $W_i$, one only needs to solve $$prox(V) = \arg\min_W \frac{1}{2}\|W_i - V_i\|_F + \rho_1\|W_i\|_1 + \rho_2\|RW_i\|_1 + \rho_3\|W_i\|_{2,1} \quad (7)$$

which can be solved efficiently using the RBCD algorithm or the decomposed projection method.

Certain experiments included implementing AutoID using two TP-LINK N750 routers: one serving as TX and the other as RX (e.g., each one having three external omnidirectional antennas). In the example, their firmware was upgraded to the disclosed CSI enabled IoT platform so that the CSI measurements from regular data frames are reported directly from the RX. A TX operated in 802.11n AP mode and a RX was connected to the TX's network in client mode. The TX was operated on 5 GHz frequency band because it has less interference and higher distance resolution due to shorter wavelength compared to 2.4 GHz band. Furthermore, the 40 MHz channel bandwidth was leveraged since a larger bandwidth introduces more CSI measurements (114 subcarriers), which increases the chance to capture the detailed small-scale fading effects caused by subtle human motions. There were no potential hazards to occupants because the TX operated in default transmission power which completely met the FCC regulations. Existing WiFi networks such as a campus network were operated as usual and other WiFi MDs coexisted during the entire experiments. The sampling rate was 700 packets/s and linear interpolation was adopted to ensure the stationary interval of consecutive CSI values when there was a packet loss.

To validate the human identification performance of AutoID, 20 human subjects (14 male and 6 female graduate students) with similar ages in the range of 23-28 years, participated in the experiments. The experiments were conducted in three typical indoor environments, including a conference room (5 m×7 m), an office zone (5.6 m×9 m) and a 1-bedroom apartment (7.5 m×8 m), to evaluate the generality of AutoID.

Figure 2C:
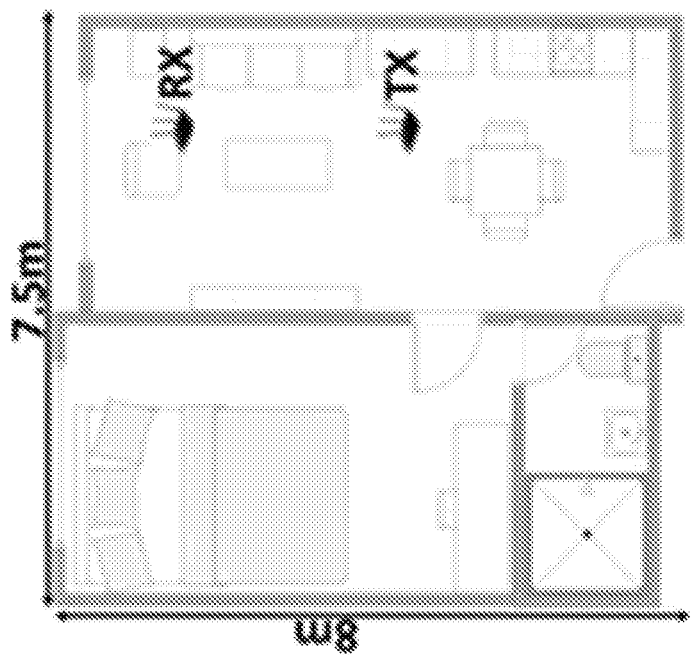
FIG. 2C illustrates an example of a floor plan of a third one of three indoor environments.
Figure 2B:
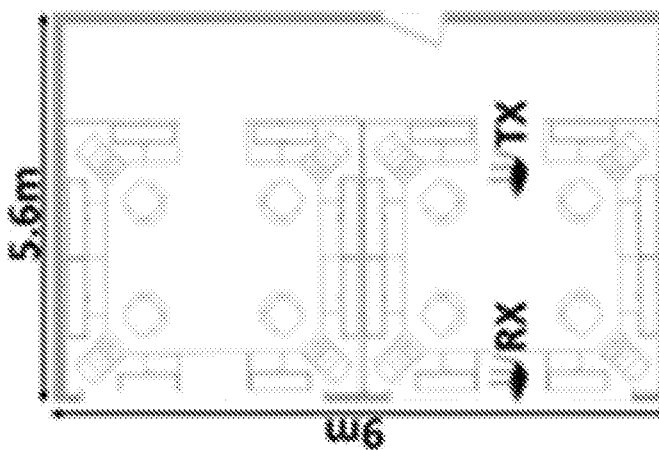
FIG. 2B illustrates an example of a floor plan of a second one of three indoor environments.
Figure 2A:
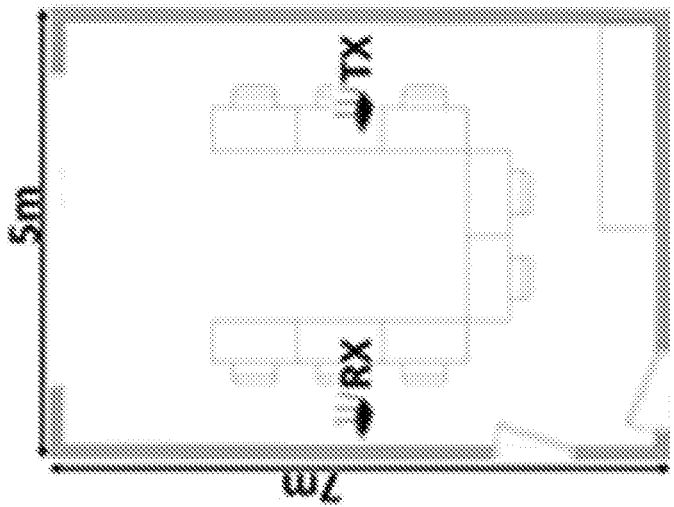
FIG. 2A illustrates an example of a floor plan of a first one of three indoor environments.

FIGS. 2A-2C demonstrate the floor plans of the locations as well as the locations of TX and RX routers. As illustrated in FIG. 2, three locations have distinct furniture layouts and sizes. In the experiments, the TX and RX routers were three meters apart and placed on tripods at height of 1.5 meters. In each location, all of the 20 subjects walked at an arbitrary pace through the LOS of the TX-RX pair for 10 times on one day (T1) to construct the model and another 10 times on another day (T2) to evaluate the performance of AutoID under both temporal and environmental dynamics.

All of the CSI data was collected anonymously to preserve occupants' privacy. Since the walking pattern of a human subject is related to his or her physiological characteristics (e.g., gender, height, and weight), these characteristics of each participant were also recorded in an anonymized database with their approvals.

Figure 3:
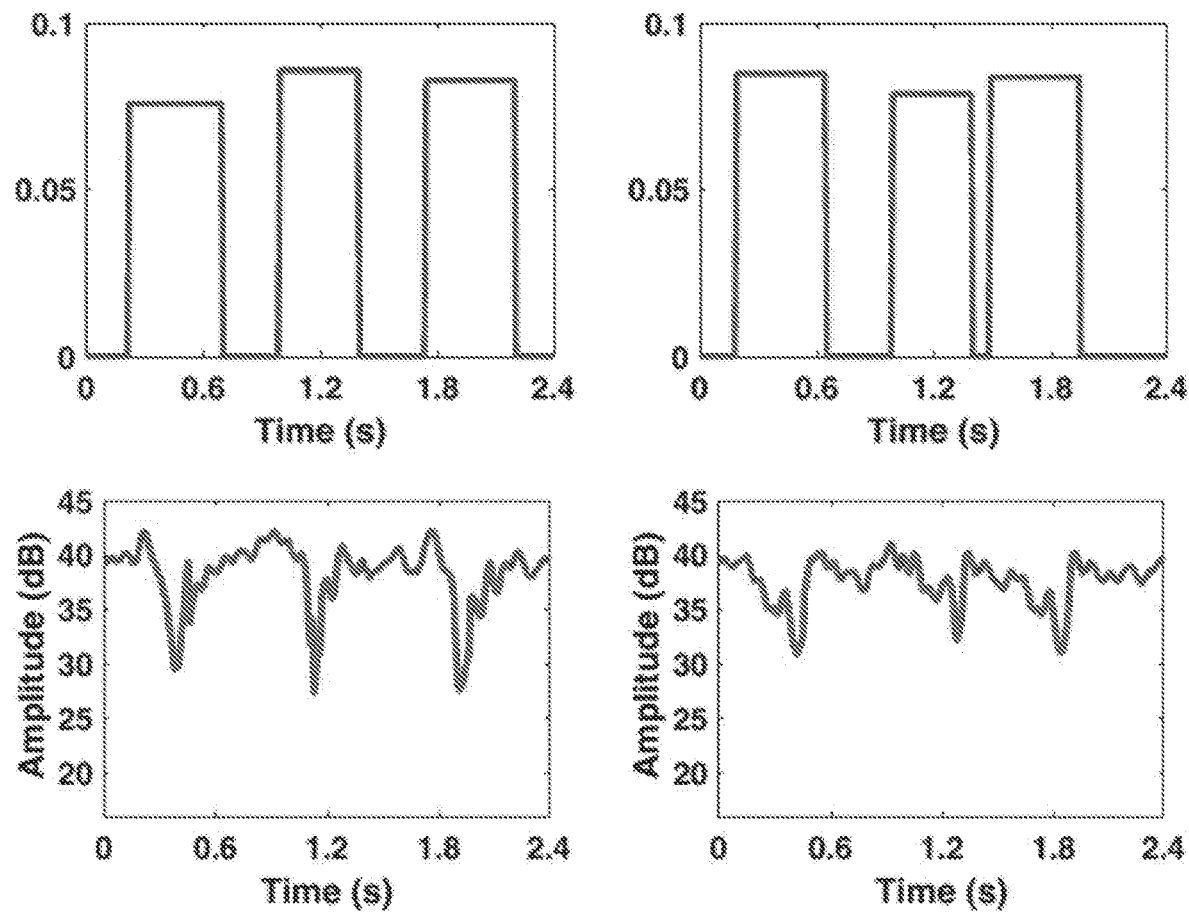
FIG. 3 illustrates a graphical example of shapelet indicator vectors and learned shapelets.

First was an evaluation as to whether the proposed $C^3SL$ framework can extract unique shapelet from the high-resolution CSI measurements as a signature for each person. FIG. 3 depicts both the learned shapelets and the shapelet indicator vectors of Person 9 and 10 as an example. As shown in FIG. 3, the lengths of the most shapelets are around 0.5 s which is similar to the step cycle time for adults, justifying that $C^3SL$ can precisely extract the gait cycles from the CSI data.

Figure 4:
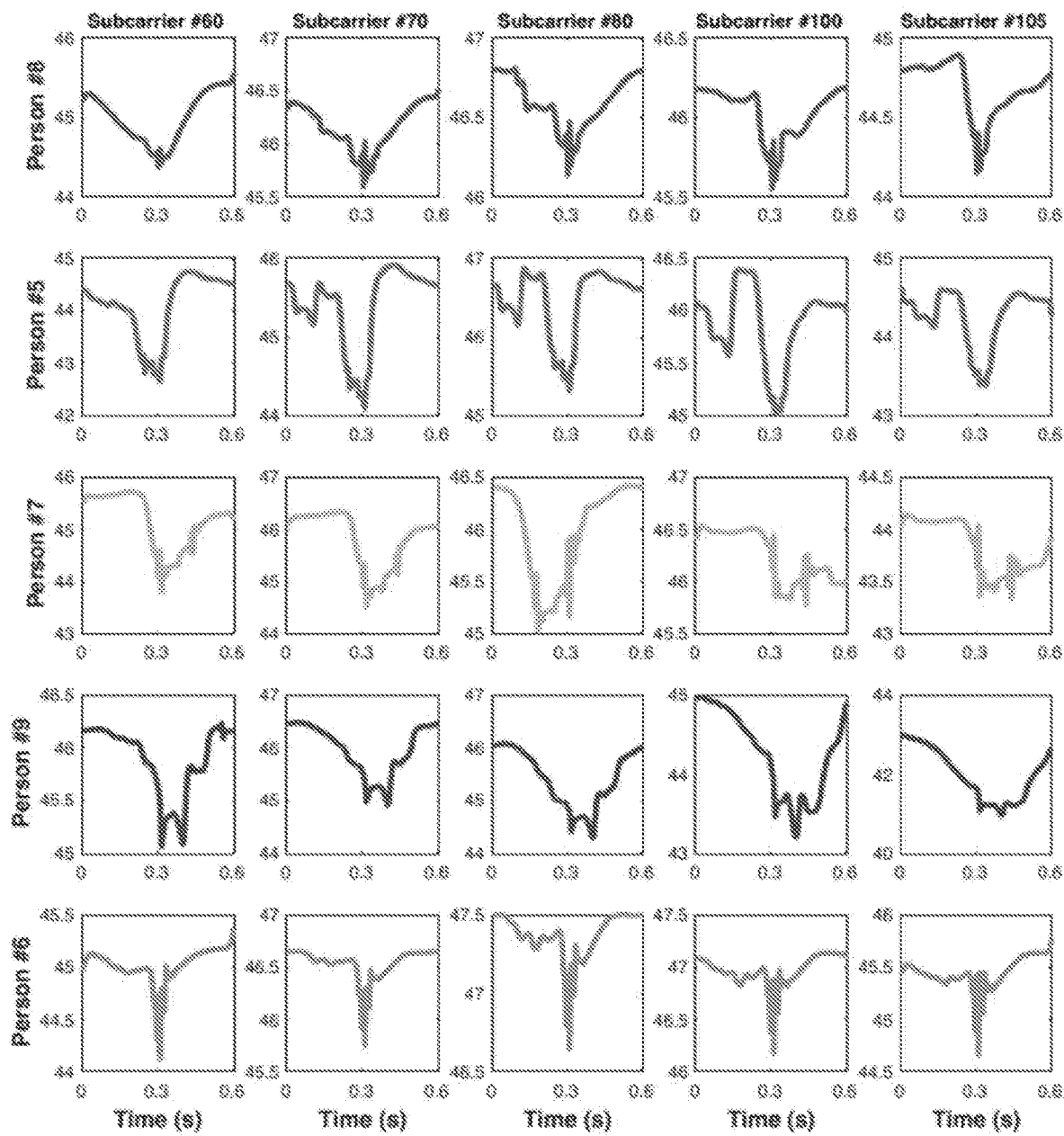
FIG. 4 illustrates a graphical example of shapelets of five distinct people.

Due to the page limit, FIG. 4 only demonstrates the shapelets learned from five distinct human subjects on five different subcarriers in the three indoor environments (see FIG. 2). It is observed from FIG. 4 that the learned shapelets of various persons are quite different from each other. Moreover, the shapelets learned by C³SL are robust (e.g., almost invariant) across different time and environmental settings, hence can be used as a unique gait signature to identify each person.

To evaluate the human identification performance of AutoID, embodiments utilized the 200 walking traces of the 20 human subjects collected during T1 to train a classifier using C³SL, and test its accuracy with the 200 walking traces obtained at T2. Two evaluation metrics were adopted, the overall accuracy, i.e., $P(\hat{y}=y)$, and the confusion matrix. Each row of the confusion matrix represents the estimated person ID while each column represents the actual (true) identities, i.e., entry (i, j) in the matrix represents the number of the times person j (the true identity) was classified as the person i.

The performance of AutoID is compared to two state-of-the-art CSI-based human identification systems (WiWho and WifiU), and two search-based shapelet learning methods (KDD14, as well as the most recent work of AAAI16). TABLE 1 below presents the average testing human identification accuracy of the five methods. AutoID achieves an average testing accuracy of 90.77% in a group of 20 people, which improves the overall accuracy by 17.6% and 15.5% over WiWho and WifiU, and 7.4% and 9.2% over KDD14 and AAAI16, respectively.

Figures 5A, 5B:
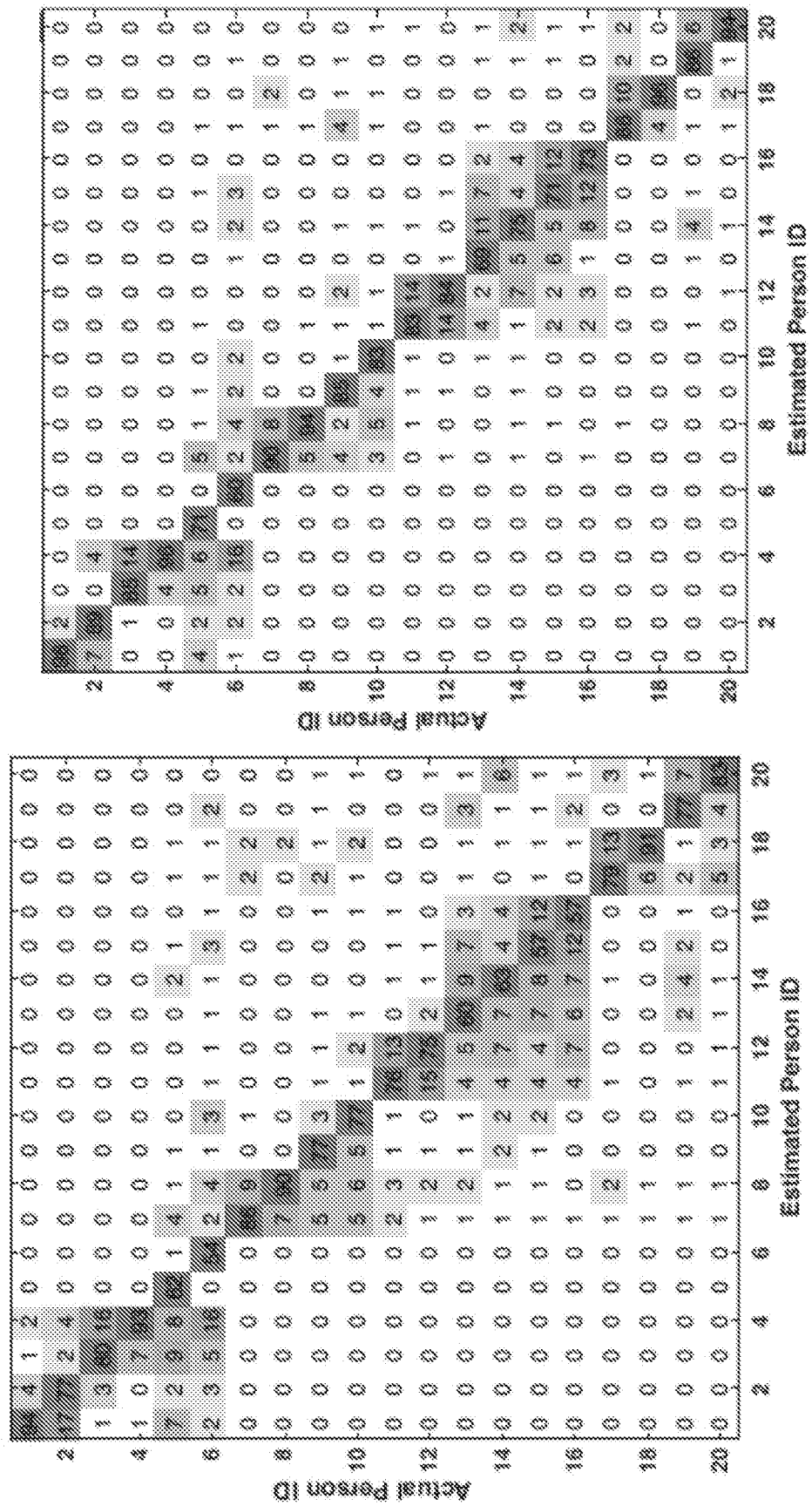
FIGS. 5A-5D illustrate a graphical example of a comparison of gesture recognition accuracy between three methods in two testbeds.
Figure 5C:
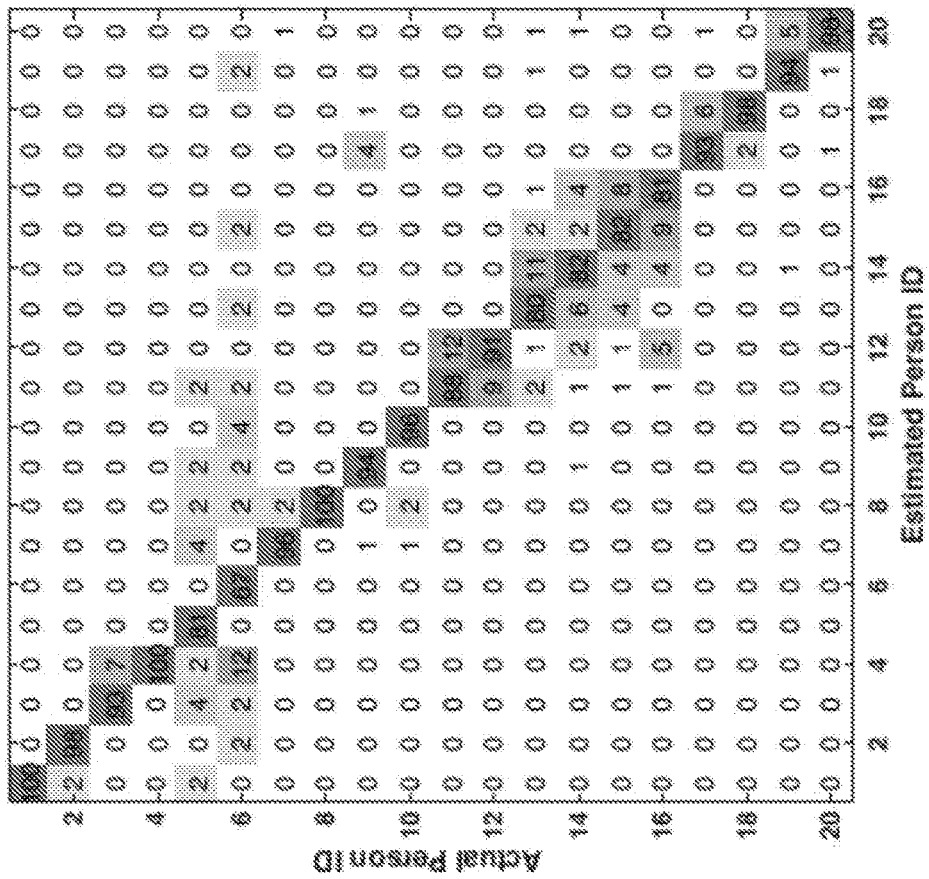
Figure 5D:
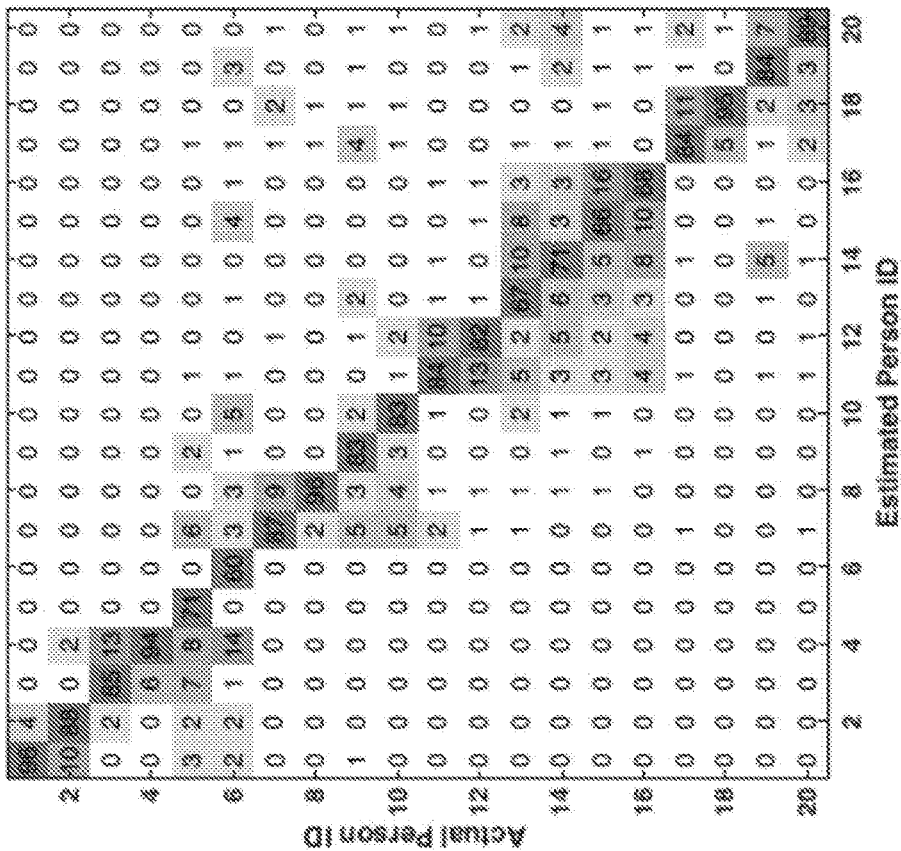

FIG. 5 depicts a graphical example of the confusion matrices of different methods. It is seen that the performance of AutoID is the best. Since the gait information of a person is related to his or her weight, height, and age, as shown in FIG. 5(d), Person 12 is misclassified with 9% to be Person 11 because both of them are female students with similar height. Similarly, Person 15 and Person 16 are misclassified to each other with 8.5% because they have similar weight. In general, AutoID can provide satisfactory human identification accuracy in a device-free and privacy-preserving manner.

Also evaluated was the efficiency of AutoID in terms of training and testing time. TABLE 1 below illustrates these two performance metrics along with other methods. As far as shapelet learning is concerned, C³ SL outperforms KDD14 and AAAI16, mainly because it is an optimization based and is much more efficient than the search based KDD14. Besides, due to the convex learning formulation, it obtains the optimal shapelet and requires less time with the help of AGGD when compared to AAAI16. It also can be observed from TABLE 1 that shapelet-based learning methods consume less time for online classification than feature engineering based methods in general because they only need sparse sub-sequences of the entire time series (shapelet) for prediction.

Figure 6:
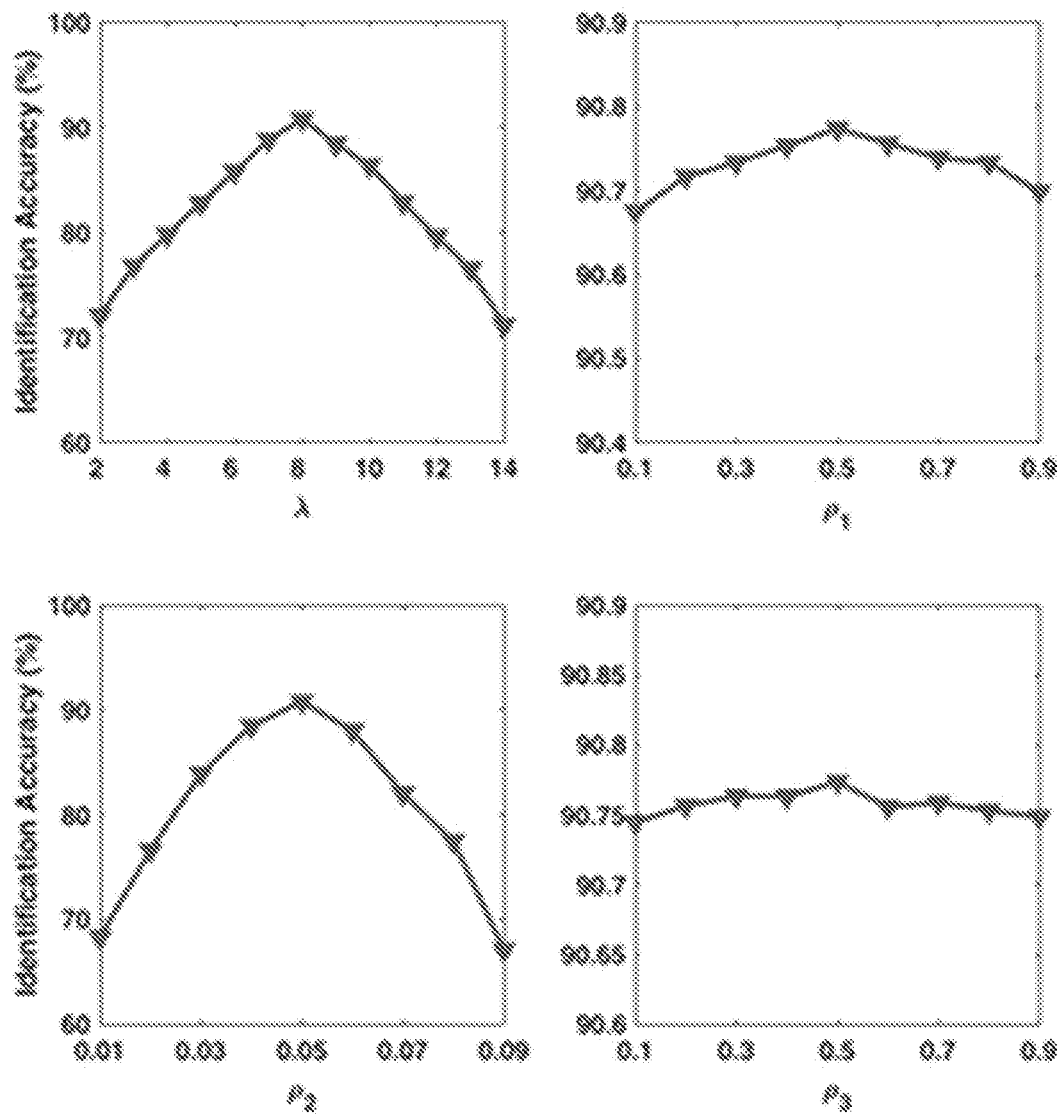
FIG. 6 illustrates a graphical example of a sensitivity analysis of certain key parameters.

The choice of the four hyperparameters, $\lambda$, $\rho_1$, $\rho_2$, $\rho_3$, in the objective equation (2) are crucial for the performance of C³SL. The above experiments included the use of an optimal value obtained from 10-folds cross validation (CV). To further illustrate their impact, FIG. 6 depicts the identification accuracy with different values of the four hyperparameters. It appears that the testing performance is more sensitive to $\lambda$ and $\rho_2$ while exhibiting less variation with different choices of $\rho_2$, $\rho_3$. This not only suggests that those four hyper-parameters should be tuned with different CV grid, but also implies that the first regularization term for "clustering" and the fused lasso regularization for continuity play a more important role in C³SL.

TABLE 1 demonstrates the performance evaluation of different methods:

| Approach | Identification Accuracy (%) | Training Time (s) | Classification Time (s) |
|---|---|---|---|
| WiWho | 73.18 | 76.72 | 1.33 |
| WifiU | 75.24 | 201.45 | 1.64 |
| KDD14 | 83.42 | 966.86 | 0.95 |
| AAAI16 | 81.59 | 127.31 | 0.91 |
| AutoID | 90.77 | 92.75 | 0.87 |

Examples of Device-Free Gesture Recognition

WiFi signals propagate through multiple paths from a TX to an RX in indoor environments due to reflection, scattering, and diffraction introduced by walls, doors, and furniture, as well as the movements of occupants. Different from the RSS which only captures the superimposition of multipath signals, CSI reveals fine-grained information about how the signal is propagated and interfered, including different time delays, amplitude attenuation, and phase shift of multiple paths on each subcarrier. Analyzing these signal propagation variations caused by human motions makes device-free gesture recognition feasible.

In short, the signal can be modeled as a channel impulse response $h(\tau)$ and the OFDM receiver is able to provide a sampled version of the signal spectrum of each subcarrier in the frequency domain, which contains both amplitude attenuation and phase shift as complex numbers. These measurements can be summarized as CSI: $H_i = \|H_i\| e^{j\angle H_i}$ where $\|H_i\|$ and $\angle H_i$ denote the amplitude and the phase of the CSI at the $i^{th}$ subcarrier respectively.

Most of existing CSI-based sensing systems adopt the Intel 5300 NIC tool to extract the CSI data from laptops with external WiFi NIC cards. Requiring laptops as receivers severely limit them from large-scale implementation. To overcome this bottleneck, a CSI enabled IoT platform may be implemented such that the CSI measurements from regular data frames transmitted in the existing traffic can be obtained directly from the COTS IoT devices, such as commodity WiFi routers.

OpenWrt may be chosen as the OS for the platform since it is a lightweight and widely used Linux OS for embedded devices. The Atheros CSI Tool may be upgraded and a new OpenWrt firmware may be developed for IoT device for CSI acquisition. In addition, the platform may report CSI data on all the 114 subcarriers for 40 MHz bandwidth on 5 GHz central frequency, which provides much more information than conventional CSI tools. At each time instance, each TX-RX pair may be able to provide $N_{TX} \times N_{RX} \times 114$ CSI amplitude and phase measurements, where $N_{TX}$ and $N_{RX}$ represent the number of TX and RX antennas, respectively.

By leveraging the disclosed CSI enabled IoT platform, a preliminary experiment may be conducted by using two TP-LINK N750 wireless routers (e.g., one as TX and another one as RX) to evaluate whether distinct CSI measurements can be revealed for human gesture identification. The two routers were put 1 m away on a table in a conference room. One volunteer performed six gestures, moving right and left, pushing and pulling, rolling right and left, near the line-of-sight of the TX-RX pair.

Figure 7:
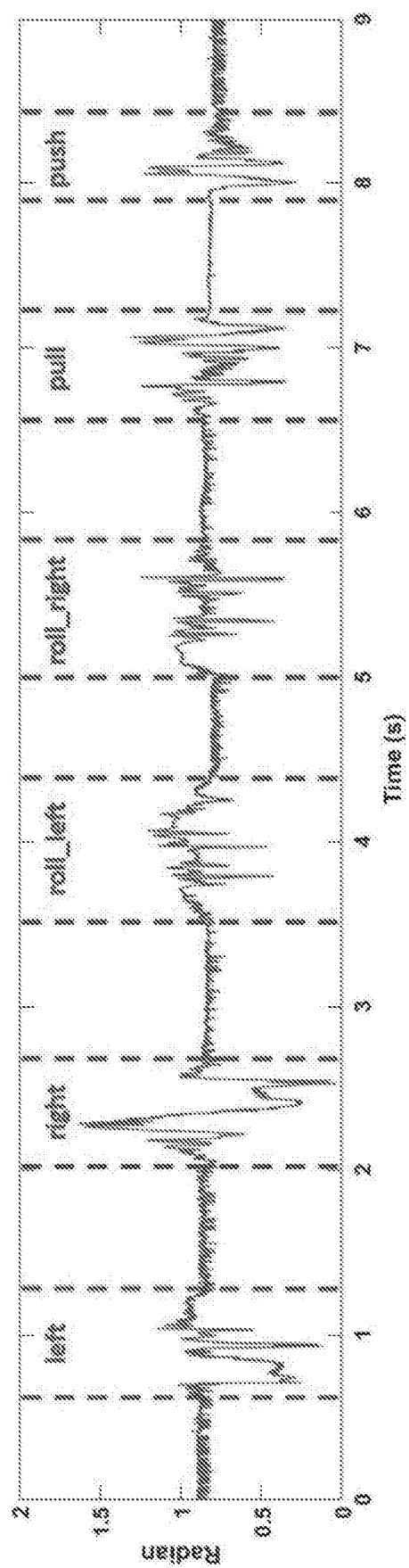
FIG. 7 illustrates a graphical example of CSI phase difference readings across an antenna pair for each of six common human gestures.

Based on experimental results, the CSI phase differences across pairs of RX antennas are more sensitive than CSI amplitude. As an example, FIG. 7 illustrates an example of CSI phase difference readings across one antenna pair and one subcarrier for six different gestures. It can be seen from FIG. 7 that when the volunteer was performing the gestures, disparate gestures perturbed in a distinct manner on the CSI phase difference readings. Pairs of relative gestures (e.g., moving right and left, rolling right and left, push and pull) display symmetrical patterns. Therefore, these observations verify that the CSI time-series data can be leveraged to identify various gestures.

Moreover, from another perspective, the time-series phase difference measurements over multiple subcarriers can be treated as 'video monitoring' for gesture recognition as shown in FIG. 7. As highlighted with red lines in the figure, the CSI time series data can be divided into small chunks with a window size Δt. The data in each window forms a CSI frame that contains n×m CSI pixels (e.g., where n is the number of consecutive samples and m represents the number of distinct measurements of CSI phase difference readings). These CSI frames may be served as an input dataset for the disclosed gesture classifier.

Figure 8:
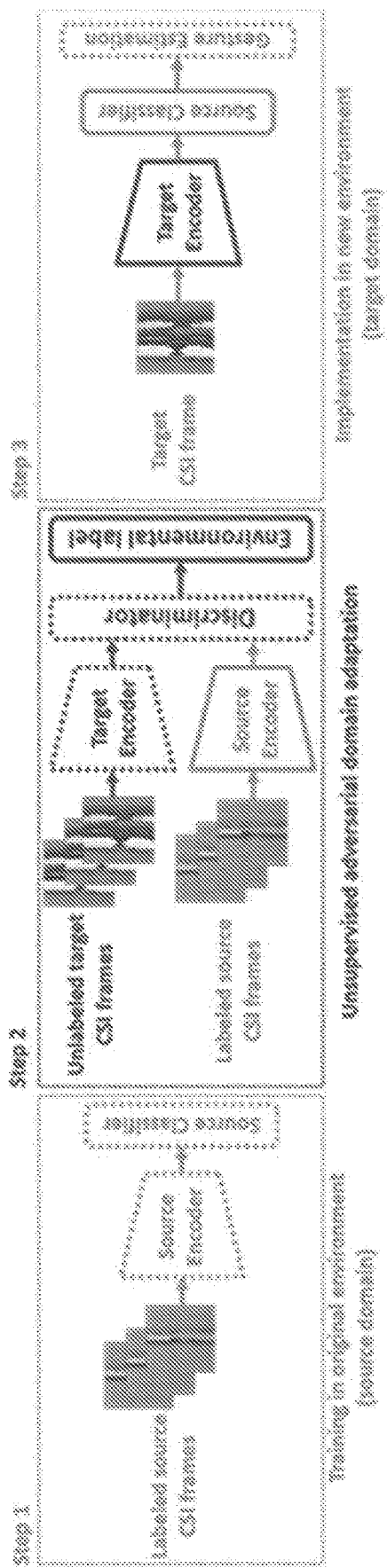
FIG. 8 illustrates an example of a system methodology in accordance with certain implementations of the disclosed technology.

Certain implementations may include a device-free WiFi-based adaptive gesture recognition system, WiADG, that aims to realize accurate and robust human gesture identification consistently under spatial and temporal variations via adversarial domain adaptation (ADA). FIG. 8 illustrates an example of a WiADG methodology in accordance with the disclosed technology.

Step 1: in the original environment (e.g., source domain), a source encoder and a source classifier are generated with the labeled source CSI frames. Suppose L CSI frames $X_s$ with labels $Y_s$ (the ground truth of gesture type) are collected in an environment (referred to as the original environment, source domain). The first step of WiADG is to train a source representation mapping (source encoder), $M_s$, and an accurate source gesture classifier $C_s$. The objective can be summarized as the following optimization:

$$\min_{M_s, C_s} L_{C_s}(X_s, Y_s) = -E_{(x_s, y_s) \sim (X_s, Y_s)} \sum_{l=1}^{L} [I_{[l=y_s]} \log D(M_s(X_s))] \quad (1)$$

Figure 9:
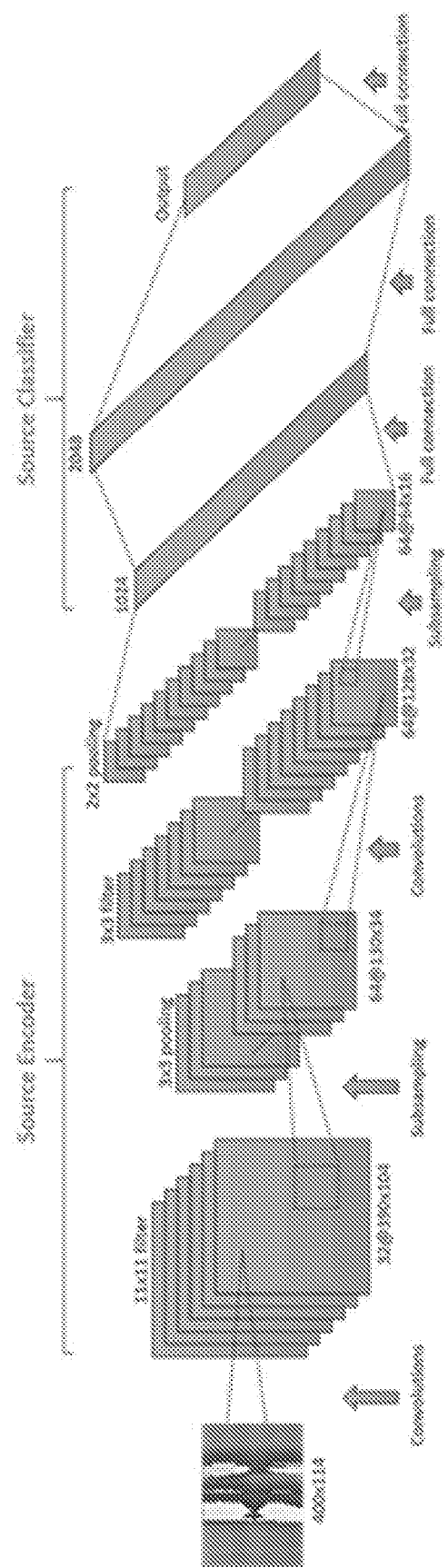
FIG. 9 illustrates an example of a neural network architecture including a source encoder and a source classifier in accordance with certain implementations of the disclosed technology.

FIG. 9 illustrates an example of the disclosed convolutional neural network (CNN) architecture for the source encoder and source classifier. The goal of $M_s$ aims to extract discriminative local features from CSI frames and map them to a latent feature space. It is composed of a cascade of two pairs of convolutional layer and subsampling layer, followed by three fully-connected layers. The objective of convolutional layer is to exploit the local dependency features from input data. It extracts local features by using a bank of filters sliding over the input followed by nonlinear activation functions.

In the example, a rectified linear unit (ReLU) may be used as the activation function in this work. The subsampling layer generally aims to reduce the dimensionality of the data while guaranteeing the invariance of feature maps by max pooling. The source gesture classifier $C_s$ consists of three fully connected layers, which is followed by the source encoder $M_s$.

The detailed dimension of each layer is illustrated by FIG. 9. To train the source encoder and the source gesture classifier, the network outputs may be calculated forwardly and the cross-entropy loss between the predicted outputs and true targets are computed. Then, ADAM may be utilized as the optimizer to back-propagate the gradient layer by layer to update the parameters (weights and biases) in CNN. In this manner, the constructed $C_s$ is able to identify various gestures accurately in the original environment.

Step 2: a target encoder is trained through unsupervised adversarial domain adaptation to map the target CSI frames to the shared latent feature space such that a domain discriminator cannot distinguish the domain labels of the data. This step of WiADG aims to recognize gestures in a brand-new environment (e.g., target domain) without the extra task of re-calibration and collection of labeled data in that environment.

Since the disclosed CSI platform is able to collect data in a non-intrusive manner with a high sampling rate, unlabeled CSI frames may be easily obtained in the target domain while a user is performing gestures. These unlabeled CSI frames from the new environment are denoted by $X_t$. With these data, the following objective is to minimize the distance between the source and target mapping distributions $M_s(X_s)$ and $M_t(X_t)$ so that the source gesture classifier $C_s$ can be directly applied to identify various gestures in the new environment without the need to learn a separate target classifier $C_t$.

Adversarial adaptation may be performed by learning a target representation mapping (e.g., target encoder) $M_t$ such that a discriminator D cannot distinguish the domain label of encoded source and target samples. It is similar to the original GAN that aims to generate fake image that is indistinguishable from the real image. In this case, the labels for the discriminator D are domain labels (source and target) instead of fake and real. The adversarial loss can be formulated as follows:

$$\min_D L_D(X_s, X_t, M_s, M_t) = \\ -E_{x_s \sim X_s}[\log D(M_s(x_s))] - E_{x_t \sim X_t}[\log(1 - D(M_t(x_t)))] \quad (2)$$

The inverted label GAN loss is employed to train the target encoder $M_t$ as follows:

$$\min_{M_t} L_{M_t}(X_s, X_t, D) = -E_{x_t \sim X_t}[\log D(M_t(x_t))] \quad (3)$$

It provides stronger gradients to the target mapping. In order to train the target encoder $M_t$ more effectively, the parameters of the source encoder $M_s$ learned in the Step 1 may be leveraged as an initialization for $M_t$ and $M_s$ may be fixed during this adversarial learning process. In the disclosed design, the discriminator D may consist of 3 fully connected layers: 1024 hidden units—2048 hidden units—binary label output. ReLU may be employed as the activation function in these layers. The parameters in $M_t$ and D may be tuned jointly using backpropagation.

Step 3: the trained target encoder maps the target CSI frames to the domain invariant latent feature space and the source classifier recognize gestures during the implementation. The network parameters in solid line boxes are fixed and those in dashed line boxes are required to train. During the implementation phase, the real-time CSI frames may be mapped to the shared feature space through the target encoder $M_t$ constructed in Step 2 firstly, and then the pre-trained source gesture classifier $C_s$ may be adopted to identify the gesture in the new environment (e.g., target domain).

In sum, as illustrated by FIG. 8, the first step of WiADG may be to train a source encoder $M_s$ and a source classifier $C_s$ with the labeled source data by optimizing $L_{C_s}$ as described in Equation (1). After that, $M_s$ may be fixed and a target encoder $M_t$ may be learned through adversarial learning, which aims to optimize $L_D$ (Equation (2)) and $L_{M_t}$ (Equation (3)) without revisiting the first objective Equation (1). In the phase of implementation, the trained target encoder $M_t$ may be used to map the target CSI frame to the latent feature space and directly use the source classifier $C_s$ to identify various gestures.

In an example, the WiADG may be prototyped using two TP-LINK N750 routers (e.g., one serving as a TX and the other as an RX) and evaluated in real indoor environments. The firmware of the routers may be upgraded to the disclosed CSI enabled IoT platform so that the CSI measurements from regular data frames may be reported directly from the RX. The TX may be operated on 5 GHz with 40 MHz channel bandwidth, which have higher opportunity to capture the detailed small-scale fading effects caused by subtle gestures, than 2.4 GHz with 20 MHz channel bandwidth.

After receiving the data frames from the TX, the RX may analyze the data packet, extract the CSI data, and forward them to a back-end computation unit through UDP. The computation unit may be a Think-pad laptop with Intel i7-4810MQ 2.80 GHz CPU and 16 GB RAM. It may process the CSI time-series data in real-time using Python. The sampling rate may be 100 packets/s and linear interpolation may be adopted to ensure the stationary interval of consecutive CSI values when there was a packet loss. The CSI phase difference across a pair of three antennas may be leveraged on an RX router to construct the CSI frame. The dimension of each CSI frame may be 400×114.

Figure 10:
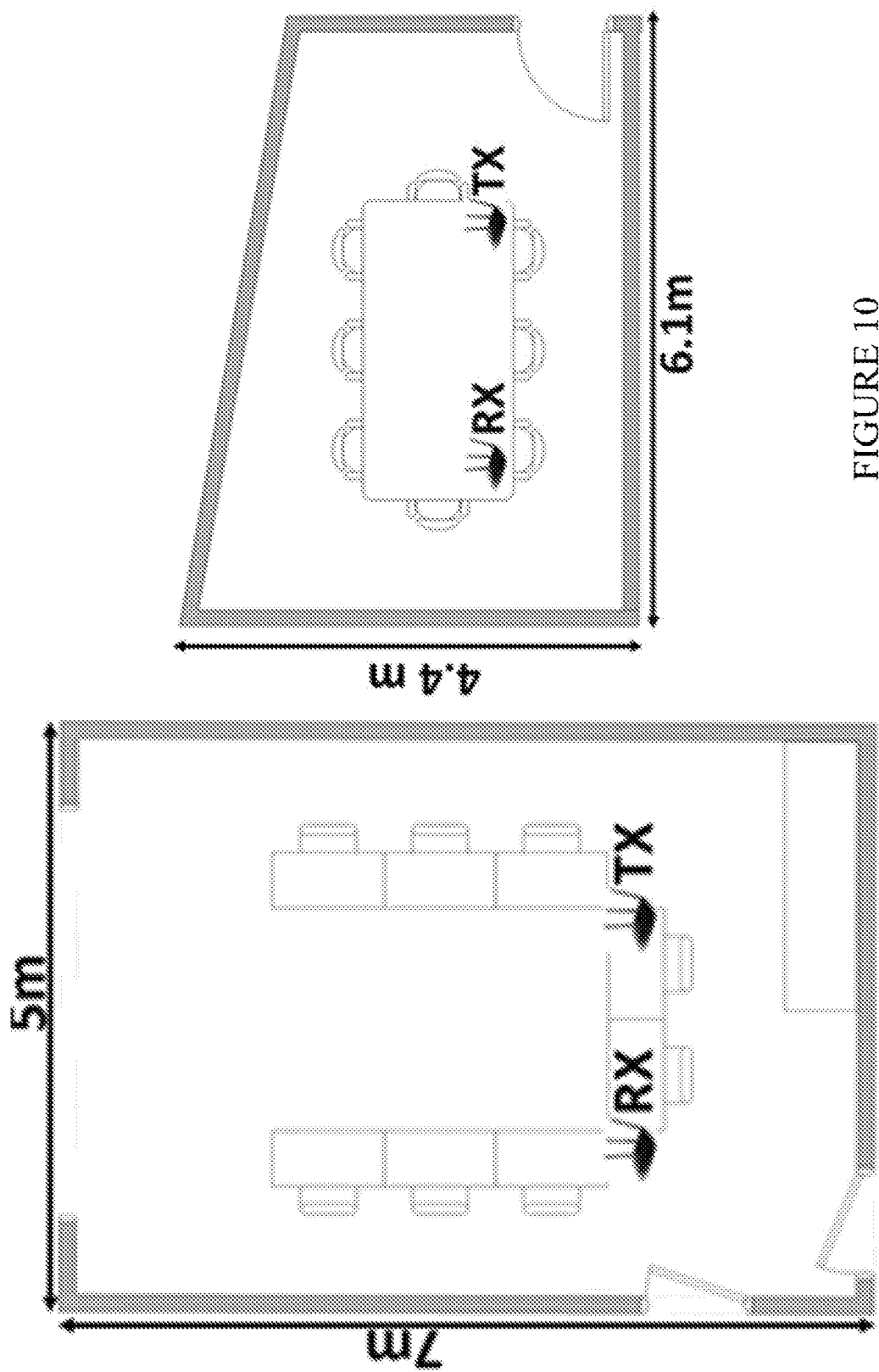
FIG. 10 illustrates an example of floor plans corresponding to a conference room and an office zone.
Figure 11:
FIG. 11 illustrates an example of a experimental setup in the conference room illustrated by FIG. 10.

Example experiments were conducted in two typical indoor environments (i.e., a conference room (7 m×5 m) and an office zone (4.5 m×5.6 m) as illustrated by FIG. 10) to validate the performance of WiADG under both same and disparate environment scenarios. TX and RX routers were put 1 m apart on a table as shown in FIG. 11 and two volunteers performed six common gestures, i.e., moving one hand right and left, rolling right and left, and push and pull. For each gesture at each testbed, 100 samples were collected on one day to train the source gesture classifier $C_s$ and other 100 samples were obtained on different days to reflect the temporal dynamics for testing purpose. In total, more than 2,500 CSI frames were acquired to validate the gesture recognition accuracy and the effectiveness of WiADG over environmental dynamics.

Figure 12A:
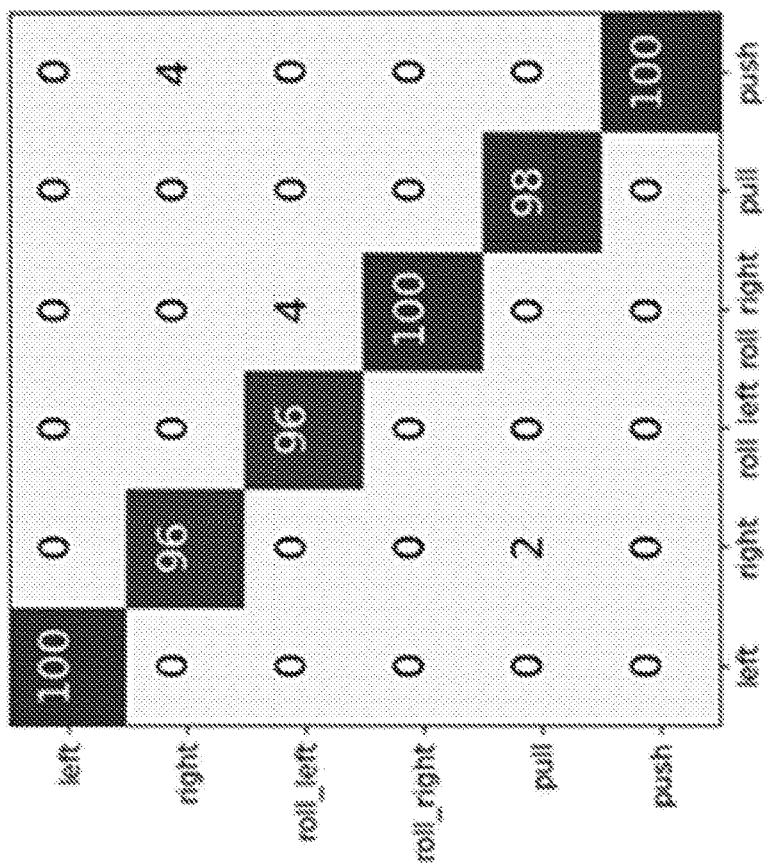
FIGS. 12A and 12B together illustrate an example of confusion matrices of gesture recognition accuracy using the disclosed WiADG in original environments.
Figure 12B:
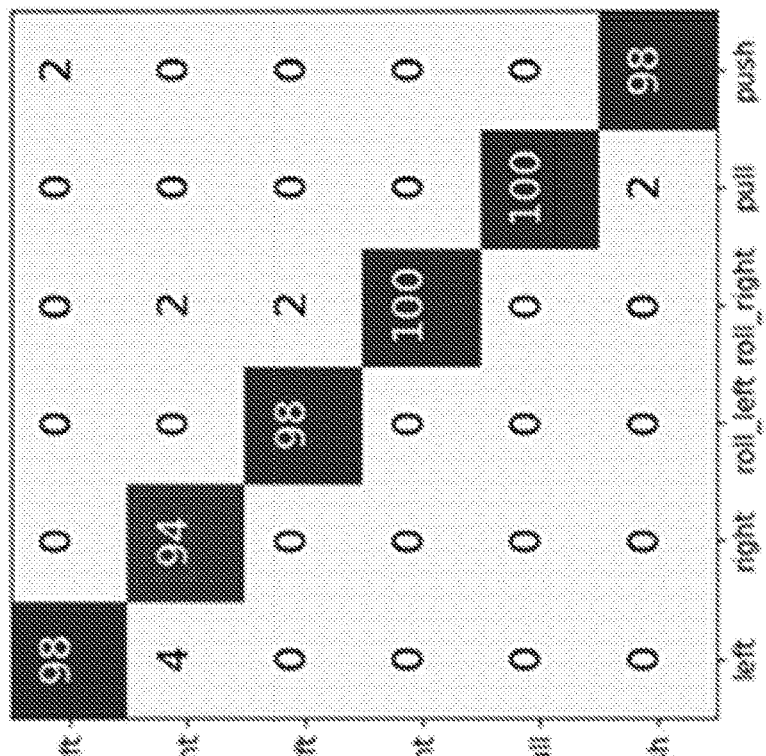

In the example, the performance of WiADG in the original environment was evaluated. In general, the WiADG achieves an average cross-validation gesture recognition accuracy of 98.3% and 98% in the conference room and the office zone, respectively. Its accuracy confusion matrices in these two environments are illustrated by FIGS. 12A and 12B. Its performance is better in the conference room than the office zone because the environmental scenario is more complicated in the office zone. Nevertheless, as shown in FIGS. 12A and 12B, the gesture identification accuracy of each category is at least 94%, validating the high stability of WiADG.

Its performance was further compared with two state-of-the-art CSI-based gesture recognition systems, WiG and WiAG. WiG adopted wavelet denoising process to sanitize the raw data and constructed a SVM classifier to distinguish gestures. WiAG utilized principal component analysis (PCA) to denoise the raw CSI amplitude data, discrete wavelet transform to generate features and KNN to train the gesture classifier.

Figure 13A:
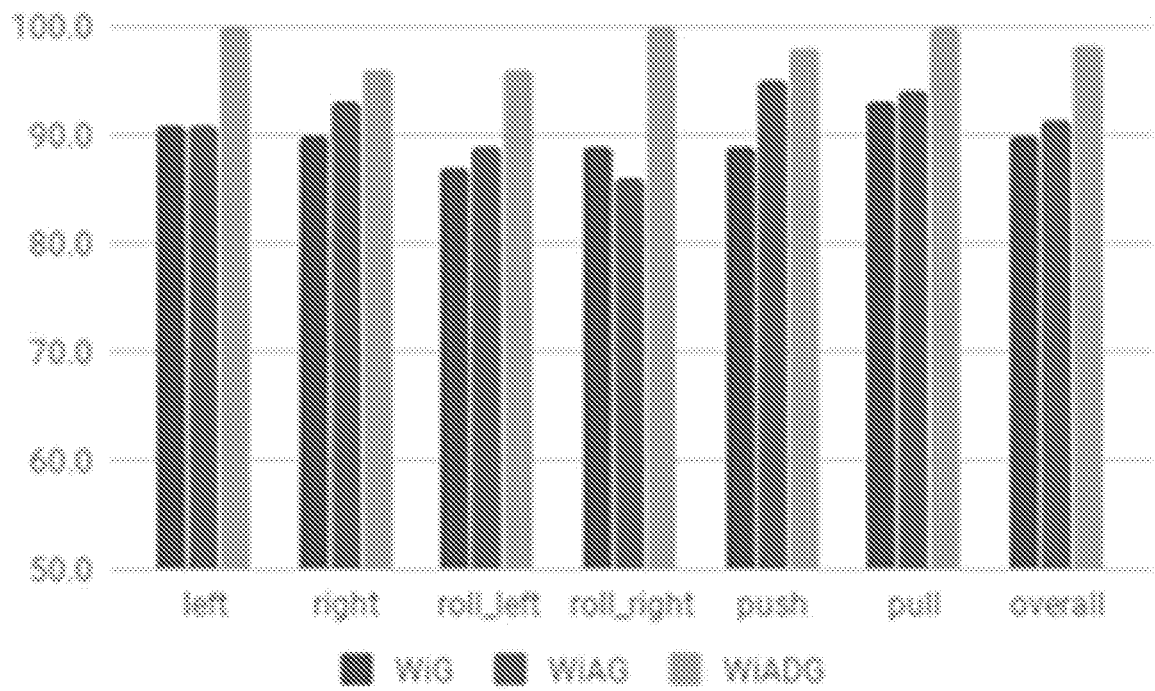
FIGS. 13A and 13B together illustrate an example of a comparison of gesture recognition accuracy between three methods in two testbeds.
Figure 13B:
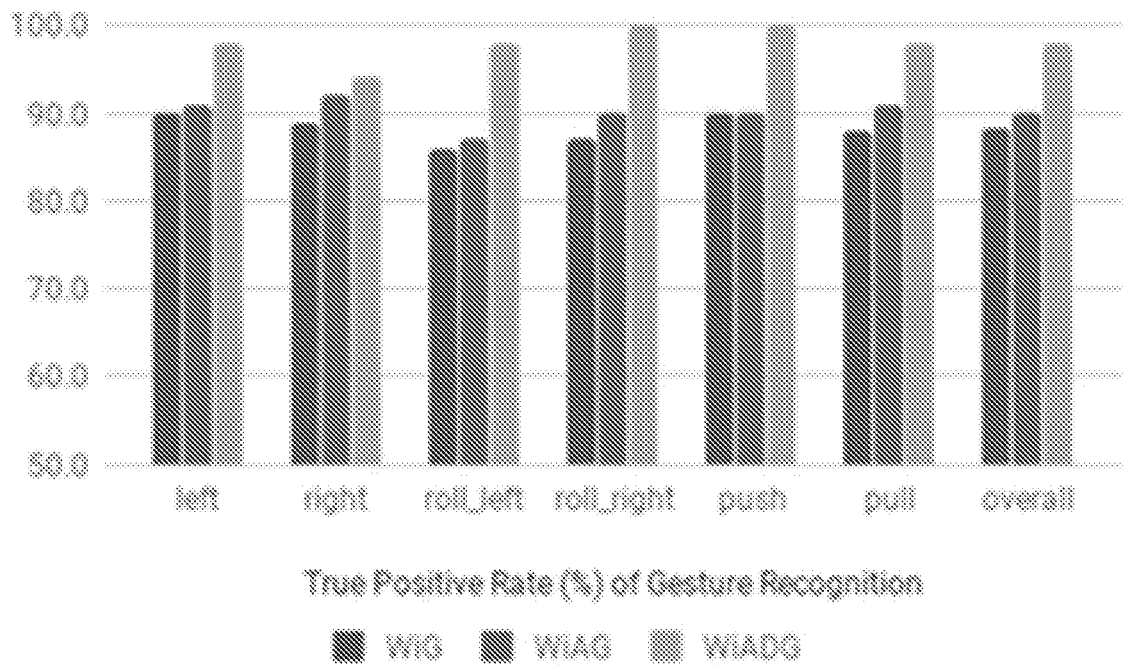

FIG. 13 evaluates the true positive rate (TPR) of the three methods. The TPR indicates the ratio of the number of times for correctly recognizing a gesture to the total number of gestures performed. As presented in FIG. 13, WiADG achieves the best accuracy for every gesture in both environments among the three approaches. It enhances the overall TPR over WiG and WiAG by 9.5% and 7.7% in the conference room, and 10.9% and 8.6% in the office zone, respectively.

Since both WiAG and WiG are employed conventional machine learning approaches to build up the classifier, they cannot precisely extract the features that are related to gestures. On the other hand, the source encoder of WiADG, which is designed based on conventional neutral network, is able to explore the local dependency among the CSI frames for better representation.

The WiADG may be further evaluated in a more realistic scenario where the testing environment (e.g., target domain) is different from the one (e.g., source domain) during the training stage. TABLE 2 compares the true positive rate (TPR) of WiADG and other methods under this circumstance. As demonstrated in TABLE 2, the performance of all the three methods degraded severely if the source classifier of each method is directly applied in the new environment. It is explainable because multi-path conditions of the original and the new environment are notably different, which leads to huge deviation of the CSI readings. Although the recognition accuracy of WiADG (source only) is slightly higher than WiG and WiAG, it is still too low for practical implementation.

TABLE 2 demonstrates the gesture recognition accuracy of different methods under environmental dynamics:

| Approach TPR (%) | Small room → Large room | Large room → Smart room |
|---|---|---|
| WiG (Source Only) | 48.8 | 36.1 |
| WiAG (Source Only) | 49.7 | 35.4 |
| WiADG (Source Only) | 50.7 | 49.3 |
| WiADG (Domain Adaptation) | 83.3 | 66.6 |

As noted above, constructing a new classifier through data collection labeling and training is extremely time-consuming and labor-intensive. Thus, the unsupervised adversarial domain adaptation may be performed to accommodate the environmental dynamics. A target encoder $M_t$ may be learned through adversarial learning to map the target CSI frames to the source latent space to minimize the impact of domain shift, and the source classifier $C_s$ may then be leveraged for gesture recognition.

As shown in TABLE 2 above, the disclosed WiADG with domain adaptation (the last row in TABLE 2) outperforms the existing methods (i.e., WiG and WiAG) by at least 30.5%. To justify the net contribution of unsupervised adversarial domain adaptation, it may also be compared with the source only WiADG, e.g., the source encoder and source classifier obtained at step 1 as shown in FIG. 8. Comparing the last two rows of TABLE 2, one can observe that the major improvement is the consequence of the disclosed novel method (e.g., step 2 and step 3 of WiADG). It provides compelling evidence to verify that the disclosed unsupervised adversarial domain adaptation method empowered the robustness of WiADG over environmental dynamics.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A system for identifying human gestures in a device-free and privacy-preserving manner in an environment, comprising:
   a first WiFi-enabled commercial off the shelf (COTS) Internet of Things (IOT) device disposed within the environment, the first WiFi-enabled COTS IOT device configured to be a transmitter (TX) to send data frames over a WiFi radio frequency communication link;
   a second WiFi enabled COTS IOT device disposed within the environment, the second WiFi-enabled COTS IOT device configured to be a receiver (RX) to obtain data frames sent by the TX through the WiFi radio frequency communication link, extract channel state information (CSI) data from the data frames, arrange the CSI data in a predefined format, and transmit the CSI data; and
   a server configured to receive and parse the CSI data transmitted from the RX, transfer the CSI data into real-time CSI frames, store the real-time CSI frames in a database, store the real-time CSI frames with a corresponding gesture label collected in an original environment, and use a trained target encoder and a source classifier to estimate and identify a gesture performed by a user, wherein the server is either disposed within the environment or physically remote from the environment, and wherein the server is configured to perform at least one of the following:
      train and construct a source encoder and the source classifier; and
      train and generate the target encoder by way of unsupervised adversarial domain adaptation, wherein the source encoder is designed as a deep neural network and wherein weights and biases parameters in the network are optimized and updated through back-propagation.

2. The system of claim 1, wherein the TX is selected from a group consisting of the following: a commodity WiFi router, a smart thermostat, a light switch, a television, and a soundbar.

3. The system of claim 1, wherein the RX is selected from a group consisting of the following: a commodity WiFi router, a smart thermostat, a light switch, a television, and a soundbar.

4. The system of claim 1, wherein the RX is configured to perform at least one of the following:
   receive the data frames sent by the TX through the WiFi radio frequency communication link;
   extract the CSI data from the data frames;
   arrange the CSI data in a predefined format; and
   send the CSI data to the server.

5. The system of claim 1, wherein the deep neural network is either or both a convolutional neural network (CNN) and a recurrent neural network (RNN).

6. The system of claim 1, wherein a gesture recognition is achieved by mapping the real-time CSI frames to a latent feature space and using the source classifier to identify the gesture performed by the user.

7. A system for identifying human gestures in a device-free and privacy-preserving manner in an environment, comprising:
   a first WiFi-enabled commercial off the shelf (COTS) Internet of Things (IOT) device disposed within the environment, the first WiFi-enabled COTS IOT device configured to be a transmitter (TX) to send data frames over a WiFi radio frequency communication link;
   a second WiFi enabled COTS IOT device disposed within the environment, the second WiFi-enabled COTS IOT device configured to be a receiver (RX) to obtain data frames sent by the TX through the WiFi radio frequency communication link, extract channel state information (CSI) data from the data frames, arrange the CSI data in a predefined format, and transmit the CSI data; and
   a server configured to receive and parse the CSI data transmitted from the RX, transfer the CSI data into real-time CSI frames, store the real-time CSI frames in a database, store the real-time CSI frames with a corresponding gesture label collected in an original environment, and use a trained target encoder and a source classifier to estimate and identify a gesture performed by a user, wherein the server is either disposed within the environment or physically remote from the environment, and wherein the server is configured to perform at least one of the following:

train and construct a source encoder and the source classifier; and train and generate the target encoder by way of unsupervised adversarial domain adaptation, wherein the source classifier is designed as a deep neural network and wherein weights and biases parameters in the network are optimized and updated through backpropagation.

8. The system of claim 7, wherein the deep neural network is either or both a convolutional neural network (CNN) and a recurrent neural network (RNN).

9. The system of claim 7, wherein the TX is selected from a group consisting of the following: a commodity WiFi router, a smart thermostat, a light switch, a television, and a soundbar.

10. The system of claim 7, wherein the RX is selected from a group consisting of the following: a commodity WiFi router, a smart thermostat, a light switch, a television, and a soundbar.

11. The system of claim 7, wherein the RX is configured to perform at least one of the following:

receive the data frames sent by the TX through the WiFi radio frequency communication link;

extract the CSI data from the data frames;

arrange the CSI data in a predefined format; and send the CSI data to the server.

12. The system of claim 7, wherein a gesture recognition is achieved by mapping real-time CSI frames to a latent feature space and using the source classifier to identify the gesture performed by the user.

13. A system for identifying human gestures in a device-free and privacy-preserving manner in an environment, comprising:

a first WiFi-enabled commercial off the shelf (COTS) Internet of Things (IOT) device disposed within the environment, the first WiFi-enabled COTS IOT device configured to be a transmitter (TX) to send data frames over a WiFi radio frequency communication link;

a second WiFi enabled COTS IOT device disposed within the environment, the second WiFi-enabled COTS IOT device configured to be a receiver (RX) to obtain data frames sent by the TX through the WiFi radio frequency communication link, extract channel state information (CSI) data from the data frames, arrange the CSI data in a predefined format, and transmit the CSI data; and a server configured to receive and parse the CSI data transmitted from the RX, transfer the CSI data into real-time CSI frames, store the real-time CSI frames in a database, store the real-time CSI frames with a corresponding gesture label collected in an original environment, and use a trained target encoder and a source classifier to estimate and identify a gesture performed by a user, wherein the server is either disposed within the environment or physically remote from the environment, and wherein the server is configured to perform at least one of the following:

train and construct a source encoder and the source classifier; and train and generate the target encoder by way of unsupervised adversarial domain adaptation, wherein the target encoder is designed as a deep neural network and trained by way of unsupervised adversarial domain adaptation to map unlabeled target CSI frames to a shared latent feature space such that a domain discriminator cannot distinguish the domain labels of the data.

14. The system of claim 13, wherein weights and biases parameters in the target encoder are optimized and updated through backpropagation.

15. The system of claim 13, wherein the deep neural network is either or both a convolutional neural network (CNN) and a recurrent neural network (RNN).

16. The system of claim 13, wherein the TX is selected from a group consisting of the following: a commodity WiFi router, a smart thermostat, a light switch, a television, and a soundbar.

17. The system of claim 13, wherein the RX is selected from a group consisting of the following: a commodity WiFi router, a smart thermostat, a light switch, a television, and a soundbar.

18. The system of claim 13, wherein the RX is configured to perform at least one of the following:

receive the data frames sent by the TX through the WiFi radio frequency communication link;

extract the CSI data from the data frames;

arrange the CSI data in a predefined format; and send the CSI data to the server.

19. The system of claim 13, wherein a gesture recognition is achieved by mapping real-time CSI frames to the shared latent feature space and using the source classifier to identify the gesture performed by the user.

* * * * *